March 28, 1944.    T. A. BOWERS    2,345,176
PISTON RING MEANS
Filed Aug. 3, 1942    2 Sheets-Sheet 1
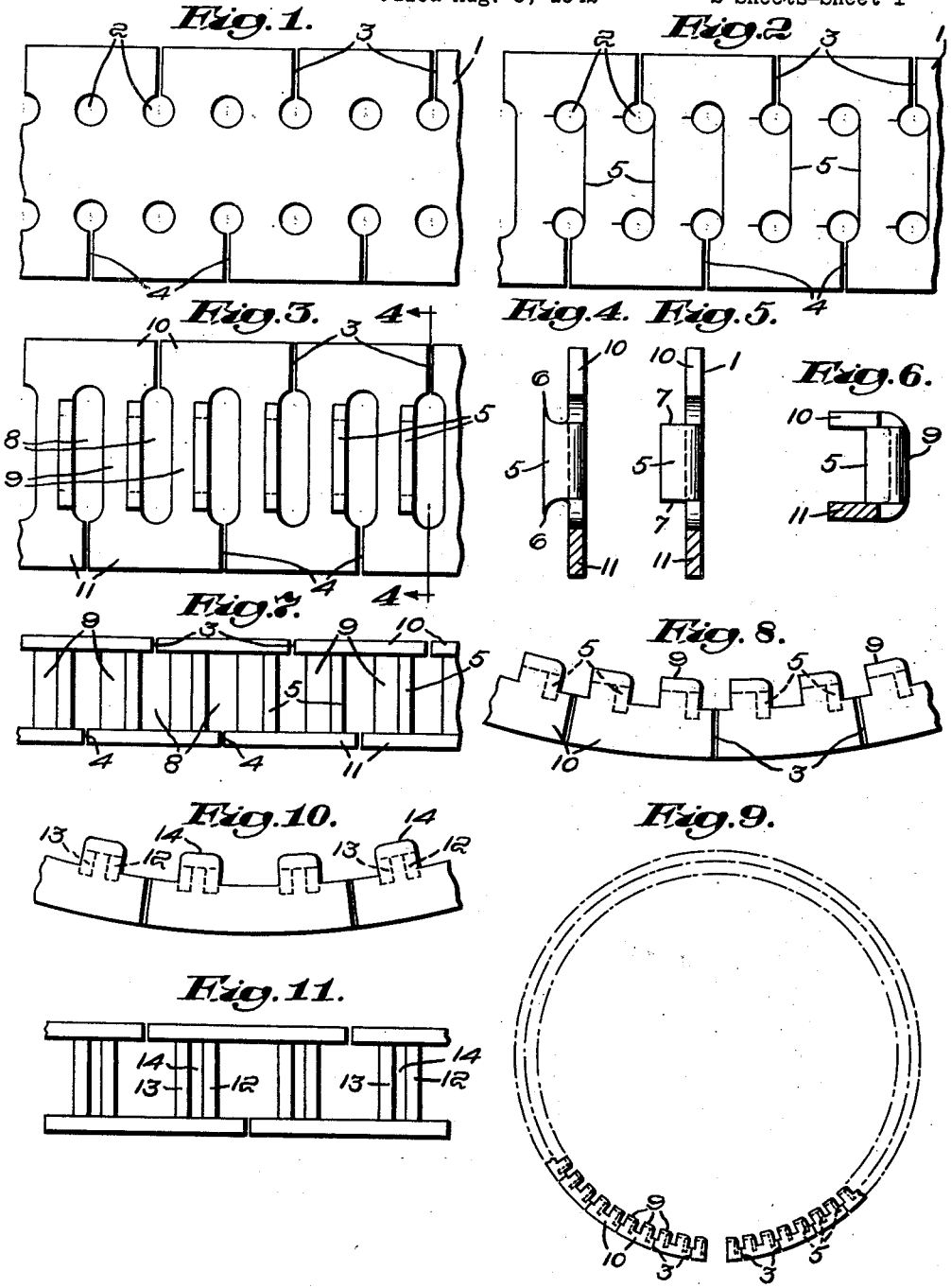
Inventor:
Thomas A. Bowers
by
Attorney March 28, 1944.  T. A. BOWERS  2,345,176
PISTON RING MEANS
Filed Aug. 3, 1942  2 Sheets-Sheet 2
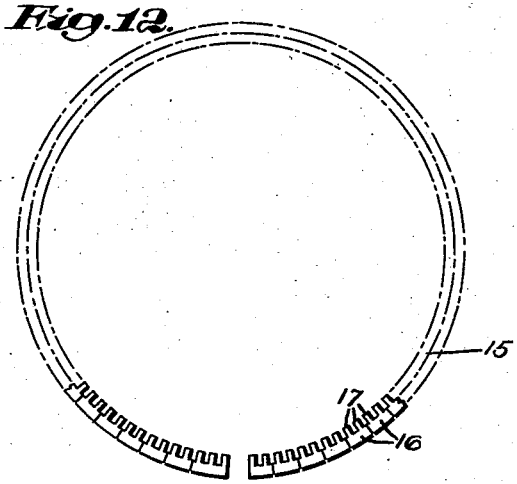
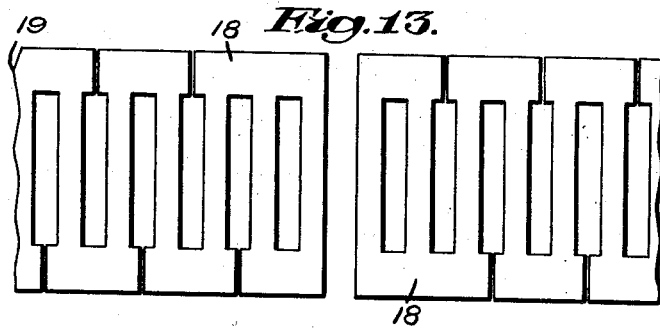
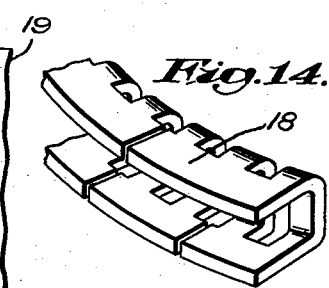
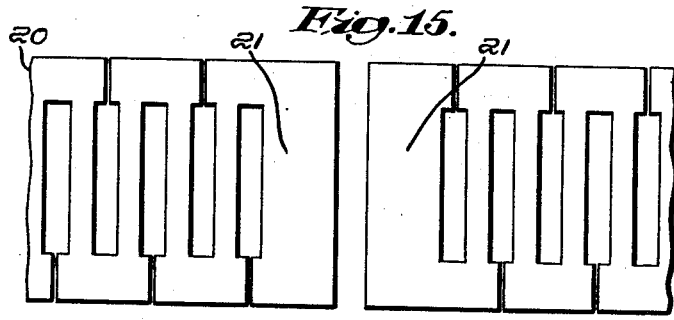
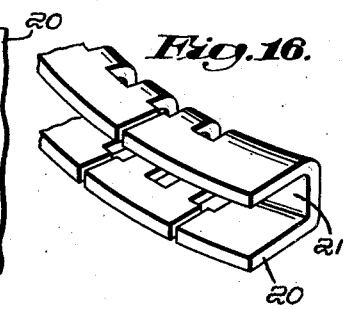
Inventor:
Thomas A. Bowers
by Munro W. Hamilton
Attorney Patented Mar. 28, 1944

2,345,176

UNITED STATES PATENT OFFICE 2,345,176

PISTON RING MEANS

Thomas A. Bowers, Mattapoisett, Mass., assignor to Power Research Corporation, Boston, Mass., a corporation of Massachusetts Application August 3, 1942, Serial No. 453,427

1 Claim. (Cl. 309—45)

This invention relates to piston rings and more especially to oil metering piston rings.

In an earlier patent, No. 2,224,338, issued to me December 10, 1940, I have described and claimed a flexible piston ring which is formed from a strip of resilient sheet metal folded longitudinally of itself and cut with openings which define crowns and connecting web portions. The crowns occur in the form of axially spaced-apart annular rows and the outer peripheral edges of the crowns function as oil scraping edges for removing excess oil from the wall of a cylinder.

An object of the invention is to improve piston rings of the flexible type referred to in the patent, and to devise reinforcing means for strengthening annular rows of crowns and for maintaining them in uniform axially spaced relation. Another object of the invention is to provide improved methods of making piston rings. The invention also aims to provide a simple, cheap and efficient piston ring.

The nature of the invention and its objects will be more fully understood from the following description of the drawings and discussion relating thereto.

In the accompanying drawings:

Figure 1 is a fragmentary plan view illustrating a step in the method of forming a piston ring of the invention from a strip of resilient sheet material;

Fig. 2 is a fragmentary plan view illustrating another step in the method referred to;

Fig. 3 is a fragmentary plan view illustrating still another step in the method;

Fig. 4 is a cross sectional view taken on the line 4—4 of Fig. 3;

Fig. 5 is a view in side elevation illustrating another step in the method;

Fig. 6 is a view in side elevation and partial cross section illustrating another step;

Fig. 7 is a front elevation of sheet material formed in accordance with steps illustrated in Figs. 1–6 inclusive;

Fig. 8 is a fragmentary plan view illustrating a final step in the method of forming the ring;

Fig. 9 is a diagrammatic view illustrating the complete ring of the invention;

Fig. 10 is a fragmentary plan view of a modification of ring;

Fig. 11 is a fragmentary elevational view of the modification illustrated in Fig. 10; and Figs. 12–16, inclusive, illustrate another modification of piston ring of the invention.

The ring of the invention includes axially spaced-apart annular rows of segments connected together by resilient webs and lying in contact, throughout a part of the radial width of the ring, with axially disposed walls or partitions which are integral with the webs. By means of the walls each crown is rigidly supported in an axial direction, thus imparting desirable stiffness to the ring at localized points without affecting normal radial and circumferential resilience and flexibility.

In forming the ring of the invention, I preferably employ a strip of piston ring material I which is pierced at separated points therealong to form rows of circular openings 2 and 3 (Fig. 1). The circular openings of one of the rows are arranged directly opposite circular openings of the other of the said rows. The edges of the strip I may then be cut to provide slots 3a and 4 which extend transversely inward and connect with the circular openings 2 and 3. The slots 3a connect with alternate circular openings 2, and the slots 4 connect with alternate circular openings 3. Also the slots 3a occur in staggered relation with respect to the slots 4.

Mid portions of the strip I are sheared along lines of cutting which occur tangentially to opposite circular openings 2 and 3, as illustrated in Fig. 2. This provides a plurality of partially severed wall portions 5 which are bent into a plane substantially at right angles to the plane of the strip, as may be seen from an inspection of Figs. 3 and 4. The partially severed portions 5 have curved ends 6 which are cut away to provide straight edges 7 (Fig. 5).

Upon bending the partially severed portions 5 into the right angularly extending position noted, there is formed in the strip I a series of openings 8 separated by webs 9. The outer edges of the strip, by means of the slots 3a and 4, also become separated into segments 10 and 11, each of which segments includes two of the web portions 9.

The strip I is bent longitudinally of itself into a generally U-shaped body, in which the crowns 10 and 11 are folded over against the edges 7 of the portions 5, as has been more clearly illustrated in Figs. 6 and 7 of the drawings. A length of the U-shaped material thus formed is then bent around into an annular position to form a piston ring such as has been illustrated in Figs. 8 and 9. The various forming operations may be readily carried out by tool machinery such as dies, punches, and the like.

The piston ring structure thus obtained includes spaced-apart annular rows of segments 10 and 11, connected together by the resilient webs 9. The crowns occur in circumferentially spaced-apart relation, and it becomes possible to close the gaps and compact the segments upon one another. In a compacted position the resilient character of the piston ring material tends to cause the crowns and webs to spring back to a normal position and in so doing to develop extensibility. The ring operates in a cylinder with its ends abutted and with the ring in a partly compacted position so that it develops uniform wall pressure on the cylinder. The annular rows of segments 10 and 11, in a partly compacted position, form substantially continuous oil scraping edges or flanges which are adapted to remove excess oil from the cylinder wall during reciprocation of a piston therein.

The portions 5 extend between the rows of segments throughout a part of the radial width of the ring, and are important in rigidly supporting the crowns 10 and 11, and in maintaining each segment of one row of segments in substantially uniformly spaced-apart relation with respect to segments of the other row. By interposing the portions 5 in the manner noted, every crown throughout each of the rows is supported to the same extent throughout the ring, thus insuring that one or more crowns at any point in the ring do not become bent or deformed to modify the oil metering action of the ring. By the stiffness thus imparted to the ring, it becomes adapted to withstand very rough handling without bending of the segments.

In the method disclosed for forming the ring, the reinforcing effect is obtained without increasing the cost of manufacture of the ring. The cutting operation which severs the mid portions of the strip along lines tangential to opposite circular openings 2 and 3 can be carried out with cutting tools such as dies or other shearing members, of the same character as are employed in performing the remainder of the operations in the process. It is pointed out that it is a relatively simple and cheap cutting operation to form circular openings in the strip. These circular openings in turn facilitate subsequent shearing operations both at the edges of the strip and at the mid portions.

I may desire to modify the piston ring and method of manufacture of the invention by providing a plurality of supporting portions 12 and 13 as illustrated in Figs. 10 and 11 of the drawings, in which it will be seen that the portions 12 and 13 are integral with web portions 14, which are spaced apart a greater amount than is the case with the web portions of the ring illustrated in Figs. 1-9, inclusive. In forming the two supporting portions, 12 and 13, web portions are made relatively wide so that cutting and bending operations, such as those illustrated in Figs. 1-4, inclusive, may be carried out at both sides of each web, thereby forming two partially severed sections bent at right angles in the manner shown.

Modifications may be resorted to in connection with forming supporting walls or partitions and mounting them between annular rows of segments. In place of a strip of piston ring material, separately formed segments may be secured to resilient web portions of wire, and other materials, by means of welding, mechanical fastenings, and in other ways.

In Figs. 12 and 16 another means of reinforcing a piston ring of segmental construction has been disclosed. A piston ring 15, made up of crowns 16 and web portions 17, is formed at some points therealong with crown portions 18, which are of increased circumferential length. This provides for a very strong crown construction, and is especially desirable for use at the ends of the ring.

Fig. 13 illustrates cutting and shearing operations directed to preparing a strip 19 of resilient piston ring material for formation into a U-shaped ring, such as has been illustrated in Fig. 14. Fig. 13 particularly illustrates a method of forming relatively long crowns at the ends of a strip intended to form the ends of a piston ring.

Figs. 15 and 16 illustrate still another ring 20, which has been formed with relatively wide web portions 21, intended to act as a reinforcement for a U-shaped piston ring of the flexible sheet metal type described. The wide web portions 21 may also be advantageously employed at the ends of the ring to avoid bending of segments at the ends of the ring from their becoming engaged over one another.

While I have shown a preferred embodiment of my invention, it should be understood that various changes and modifications may be resorted to, in keeping with the spirit of the invention as defined by the appended claim.

I claim:

As an article of manufacture a piston ring comprising a strip of resilient piston ring material formed into an annular body, said strip being folded longitudinally of itself to present a generally U-shaped cross section, edges of the strip being formed with staggered overlapping openings extending throughout a part of the width of the strip to define upper and lower rows of circumferentially spaced-apart segments and connecting web portions for each of the segments, said web portions throughout a part of their length being bent over along one edge to provide supporting portions axially extending between the upper and lower rows of segments, each segment in one of the rows including a pair of supporting portions which are integral with two adjacent segments in the other of the rows.

THOMAS A. BOWERS.